US007053753B2

(12) United States Patent
Kacalek et al.

(10) Patent No.: US 7,053,753 B2
(45) Date of Patent: May 30, 2006

(54) WIRELESS COMMUNITY ALERTING SYSTEM

(75) Inventors: Todd N. Kacalek, Plymouth, MN (US); Thomas C. Wright, St. Anthony, MN (US); Blake A. Wolf, Eden Prairie, MN (US)

(73) Assignee: Vinewood Technical Services, Inc., Plymouth, MN (US)

( * ) Notice: Subject to any disclaimer, the term of this patent is extended or adjusted under 35 U.S.C. 154(b) by 837 days.

(21) Appl. No.: 10/084,011

(22) Filed: Feb. 25, 2002

(65) Prior Publication Data

US 2003/0163532 A1 Aug. 28, 2003

(51) Int. Cl.
*G08B 5/22* (2006.01)
*H04Q 1/30* (2006.01)
*H04Q 7/00* (2006.01)

(52) U.S. Cl. ..................... 340/7.1; 340/7.35; 340/7.55; 455/435.1

(58) Field of Classification Search ................. 340/7.1, 340/7.35, 7.43, 7.45, 7.5, 7.58; 455/435.1, 455/550.1, 601, 415, 458; 379/220.01, 211
See application file for complete search history.

(56) References Cited

U.S. PATENT DOCUMENTS 4,155,042 A 5/1979 Permut et al.
4,415,771 A 11/1983 Martinez
4,633,515 A 12/1986 Uber et al.
4,796,024 A * 1/1989 Sakoh et al. ............... 340/7.58
4,956,875 A 9/1990 Bernard et al.
5,012,234 A * 4/1991 Dulaney et al. ........... 340/7.39
5,121,430 A 6/1992 Ganzer et al.
5,193,216 A * 3/1993 Davis ........................ 455/67.7
5,320,561 A * 6/1994 Cook et al. ................. 439/500
5,369,399 A * 11/1994 Tribbey et al. ............. 340/652
5,572,201 A 11/1996 Graham et al.
5,705,995 A * 1/1998 Laflin et al. ............... 340/7.48
5,784,001 A * 7/1998 Deluca et al. ............. 340/7.56
6,020,828 A * 2/2000 Gotou ....................... 340/7.56
6,044,248 A * 3/2000 Mochizuki et al. ........ 340/7.47
6,084,510 A 7/2000 Lemelson et al.
6,085,068 A * 7/2000 Eaton et al. ............... 340/7.22
6,112,074 A 8/2000 Pinder
6,157,316 A * 12/2000 Okayama et al. .......... 340/7.32
6,177,873 B1 1/2001 Cragun
6,205,322 B1 * 3/2001 Muramatsu ................ 340/7.53
6,346,890 B1 2/2002 Bellin
6,628,194 B1 * 9/2003 Hellebust et al. ............ 340/7.5

FOREIGN PATENT DOCUMENTS

WO WO 93/01574 1/1993

* cited by examiner

*Primary Examiner*—Michael Horabik
*Assistant Examiner*—Nam Nguyen
(74) *Attorney, Agent, or Firm*—Nikolai & Mersereau, P.A.; Thomas J. Nikolai

(57) ABSTRACT

A pager-based alert system includes a monitor center that is in telephonic or data communication with a paging station allowing the command center to send multi-digit code words where selected digits comprise an address for selecting one or more of a plurality of physical units (paging receivers) and to direct the receiver to output visible and/or audible signals indicative of a particular alert condition. By providing the physical unit with graphic icons overlaying the visual indicators, an observer can readily determine the nature of the alert condition so that appropriate remedial action can be taken.

29 Claims, 5 Drawing Sheets

WIRELESS COMMUNITY ALERTING SYSTEM

BACKGROUND OF THE INVENTION

I. Field of the Invention

This invention relates generally to electronic messaging systems, and more particularly, to a pager-based community alerting system for informing subscribers of immediate or impending conditions so that an appropriate response may be made.

II. Discussion of the Prior Art

The prior art includes a large number of patents and publications relating to emergency warning systems whereby members of the public can be alerted to such events as dangerous weather conditions, terrorist activities, environmental hazards and the like. The Lemelson et al. U.S. Pat. No. 6,084,510 describes a danger warning and emergency response system having an extensive listing of prior art relating to such systems. The apparatus of the Lemelson '510 patent is intended to provide emergency information to large multitudes of persons who may be in harms way. Given the fact that the implementation described in the '510 patent calls for satellites, pilotless aircraft, a downlink to a command center having one or more computers for analyzing received information from the satellites to arrive at a "danger index" as well as a ground base radio broadcasting system, the implementation cost would price the system out of reach of most subscribers.

The prior art is also replete with systems specifically designed for warning citizens of impending natural disasters, such as tornadoes, hurricanes, heavy snow and ice storms in an affected geographical area. For example, the Uber et al. U.S. Pat. No. 4,633,515 describes an emergency broadcast alert system that comprises a radio receiver referred to as a "scanner" that is designed to lock onto a broadcasted signal in the presence of noise. The receiver then repeatedly scans within a predetermined frequency band, looking for a transmitted signal from the National Weather Service and the receiver then provides an audible alarm so that one would, therefore, have to resort to broadcast television or radio to find out the storm path and expected time of arrival in a given geographical area. Thus, while the Uber system is relatively inexpensive, it lacks a capability to promptly advise a listener of important information relating to a potentially dangerous storm.

U.S. Pat. No. 6,177,873 to Cragun also describes a weather warning system that includes a communication link for receiving transmitted alerts (weather warnings/watches). It also includes a user interface that allows for selection of different geographic areas so that weather conditions affecting areas other than those of interest are filtered out. For proper operation, it is essential that the system be preprogrammed to identify geographical areas and weather intensity parameters. The ability to program the system may exceed the capabilities of many end-users.

Thus, a need exists for a subscriber-based alerting system that is inexpensive to implement and, thus, well within the budget of most persons occupying houses, apartments and other residential units as well as commercial and government establishments and that requires little or no manual involvement, yet is both versatile and reliable in operation.

SUMMARY OF THE INVENTION

According to the present invention, an electronic messaging system for both emergency and non-emergency events affecting different communities or subscriber groupings comprises a monitoring center for accepting and verifying alerts from authorized agencies. The monitoring center may be coupled through a public switched telephone network or dedicated data network to at least one paging provider network having the ability to broadcast a radio-frequency carrier suitably modulated with information, including addressing data and message data, based upon paging data input from the monitoring center pertaining to an alert. A plurality of physical units are installed in residential, commercial, and government buildings. Each includes a receiver, tunable to the carrier frequency of a paging provider network, a demodulator for recovering the address data and message data sent by the paging terminal, a microprocessor coupled to receive the addressing and message data, where the microprocessor further includes a memory that stores a list of codes pertinent to a particular end user physical unit. The physical units also include a plurality of visual and audible signaling devices that become activated between an off-state, an on-state, or a blinking-state only when received addressing data matches an entry in the physical unit's stored code list. The physical units may also include an alphanumeric display to convey verbiage pertaining to a particular alert.

In accordance with a further feature of the invention, a graphics icon may be associated with each of the visual indicating devices to readily convey in a non-lingual manner the nature of the alert being sent to occupants viewing the physical unit. For example, the icon may comprise a funnel cloud to represent a tornado warning or an automobile to indicate parking restrictions.

Various other features and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
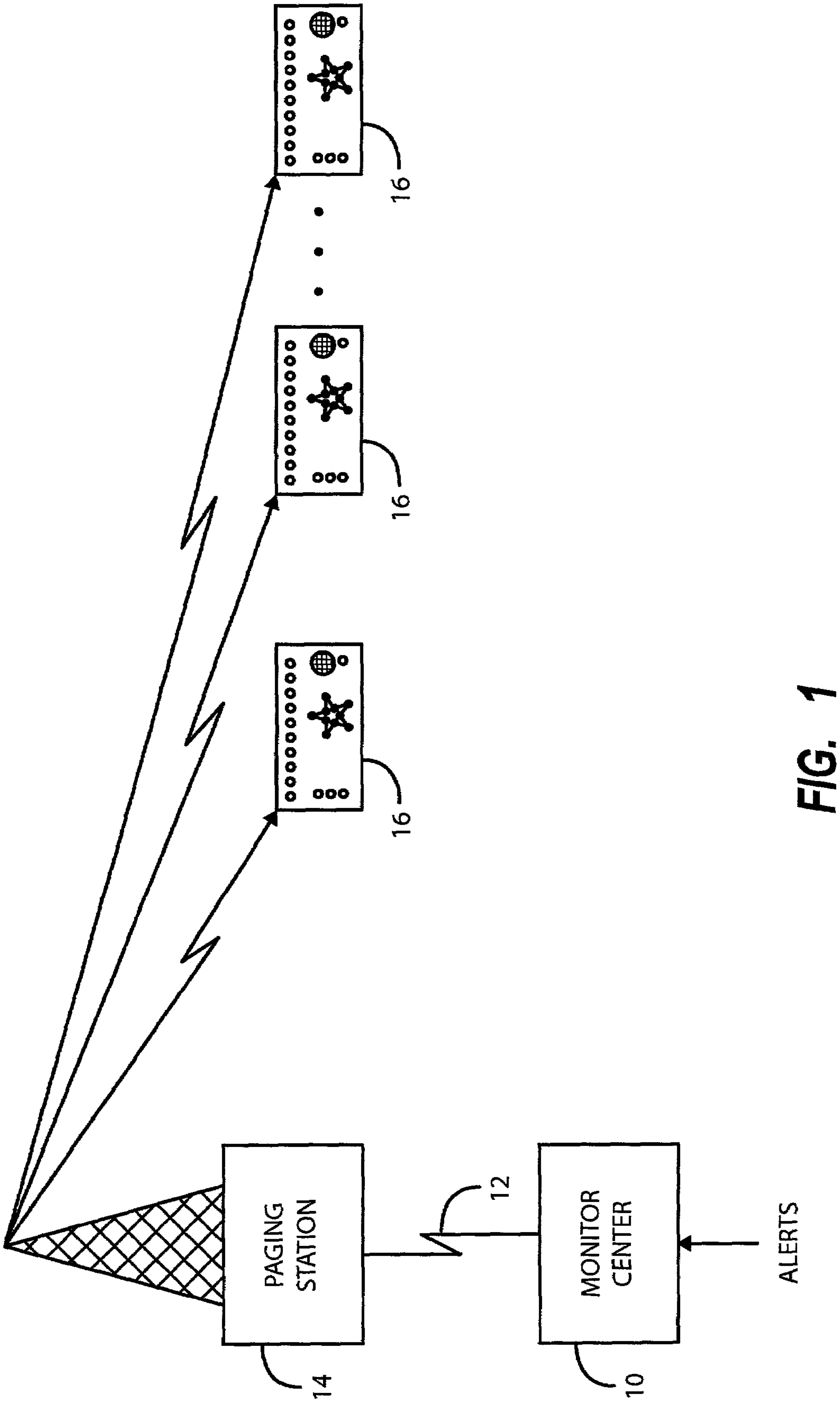
FIG. 1 is a general block diagram of the electronic messaging system comprising a preferred embodiment of the present invention.

Referring first to FIG. 1, there is illustrated a system block diagram of the electronic messaging system of the present invention. It comprises a monitoring center 10 that is coupled by a communications link 12 to a paging provider network 14 having transmission equipment for broadcasting information to one or more physical units 16. Virtually many thousands, millions or an unlimited number of physical units 16 may be incorporated into the messaging system contemplated.

The monitoring center 10 incorporates a computing and communications networking equipment and an operator who may receive a variety of alerts from authorized public and/or private agencies or individuals. The operator at the monitoring center determines the legitimacy of the alert in question. He/she may then contact the paging provider network, sending an alpha and/or numeric message, via a public switched telephone network or data network to the paging transmitter 14 of a licensed paging service provider. The paging transmitter receives, processes, stores and forwards information input by the monitoring center 10 staff who has validated the call by determining the authenticity of the calling agency or individual. An RF transmission system owned by the paging company is often comprised of a plurality of transmitters capable of accepting data from the telephone lines. It should be understood, however, that instead of telephone lines, the communication link 12 may also comprise an RF link, data network or satellite transmission. Upon decoding the alert data, the transmitter translates the paging data into a signal that modulates an RF carrier signal of a desired frequency.

The physical units 16 are modified versions of commercially available receivers, which can be leased from a paging service provider or purchased through various retailers, and are adapted to receive messages transmitted to it from the pager terminal 14.

Once the paging transmitter 14 receives a page message from the monitoring center 10, it processes, stores and forwards the information to another paging transmitter through its communications network and/or ultimately on to the physical unit(s) 16. The processing step involves encoding the paging data for transmission through the carrier paging system. Typically, an encoder accepts the incoming paging message, validates the pager address and "encodes" the address and page data into the appropriate paging signaling protocol. Once the page is encoded, it is sent to the RF link system, which includes the link transmitter and link receiver. A link transmitter sends the page to a link receiver, which is located at another paging terminal site along the channel. The transmitters of the paging terminal(s) then broadcast the page across the coverage area on the specified carrier frequency.

Once data is received from the encoder, the paging protocol employed at the paging transmitter 14 organizes the message into frames of data, which is a specified sized packet of data bits. One popular paging protocol developed by the Motorola Company is referred to as FLEX®. In it there are a total of 128 frames and it takes exactly four minutes to transmit all 128 frames. The FLEX protocol provides a variety of common services, such as message routing, encryption, data compression to enable applications to send messages reliably, securely and efficiently over the communication channel comprising one or more paging terminal(s) 14 to the physical units 16. Other protocols are also available.

Figure 2:
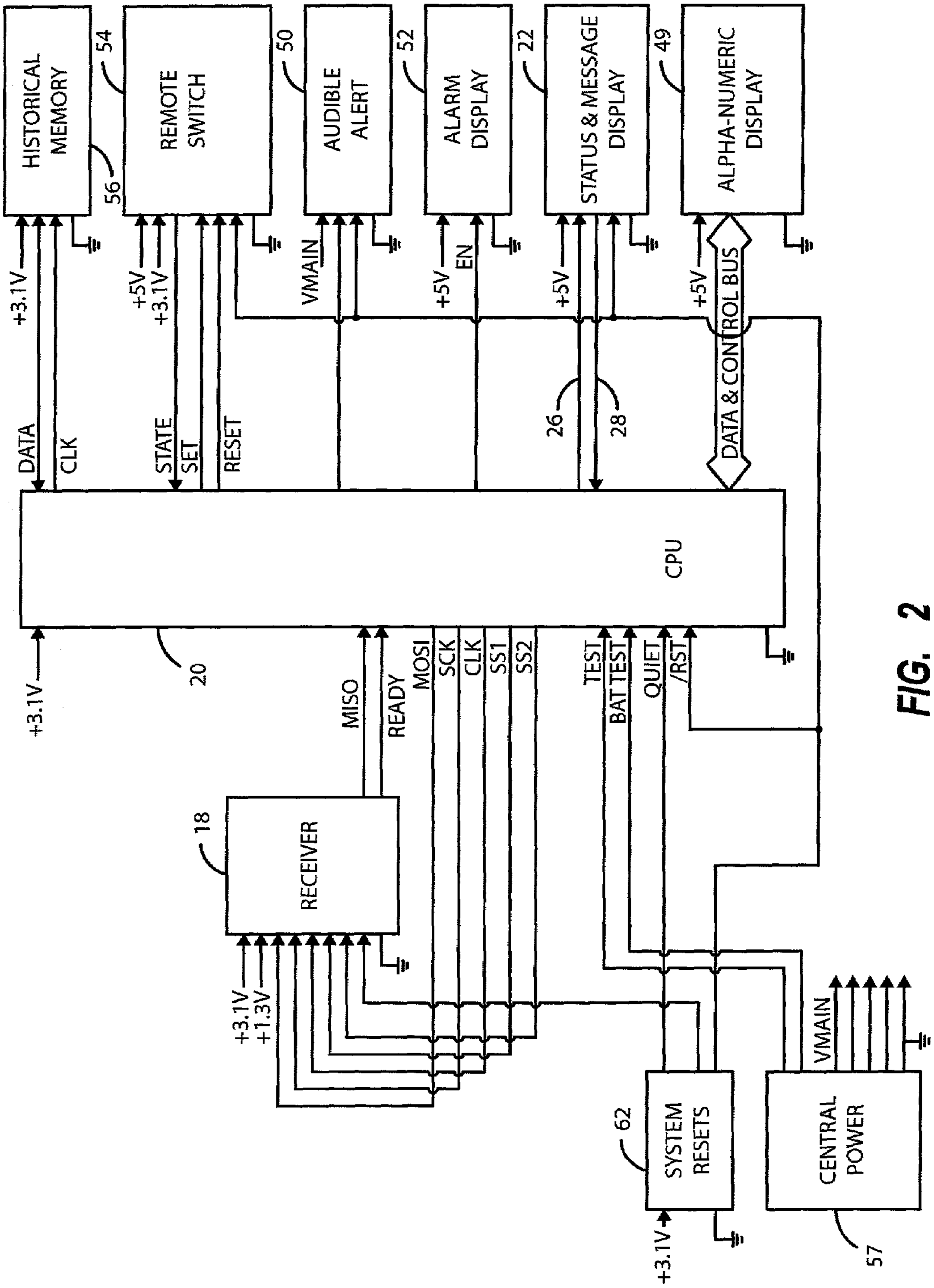
FIG. 2 is a block diagram of each of the physical units (PU) illustrated in FIG. 1.

Turning next to FIG. 2, there is shown a block diagram of each of the plurality of physical units 16. The heart of the physical unit 16 is a receiver module 18 coupled to receive the encoded messages transmitted by the pager transmitter 14. Without limitation, the receiver 18 may be a Motorola Type LS350, which is operatively coupled to a microprocessor 20, preferably a microchip Type TMP86FS41 Flash-based 8-bit CMOS microcontroller. While this microcontroller is not the only commercially-available unit that can be used, its architecture provides a 16-bit wide instruction word with separate 8-bit wide data buses. A two-stage instruction pipeline allows all instructions to execute in a single cycle except for programmed branches. It incorporates a large register set that can be used to achieve very high performance. As such, it is well suited to use in home appliances, consumer electronics and hand-held electronics. Because of its wide application, it has a relatively low cost, making it a good choice for use in the present invention.

Figure 3:
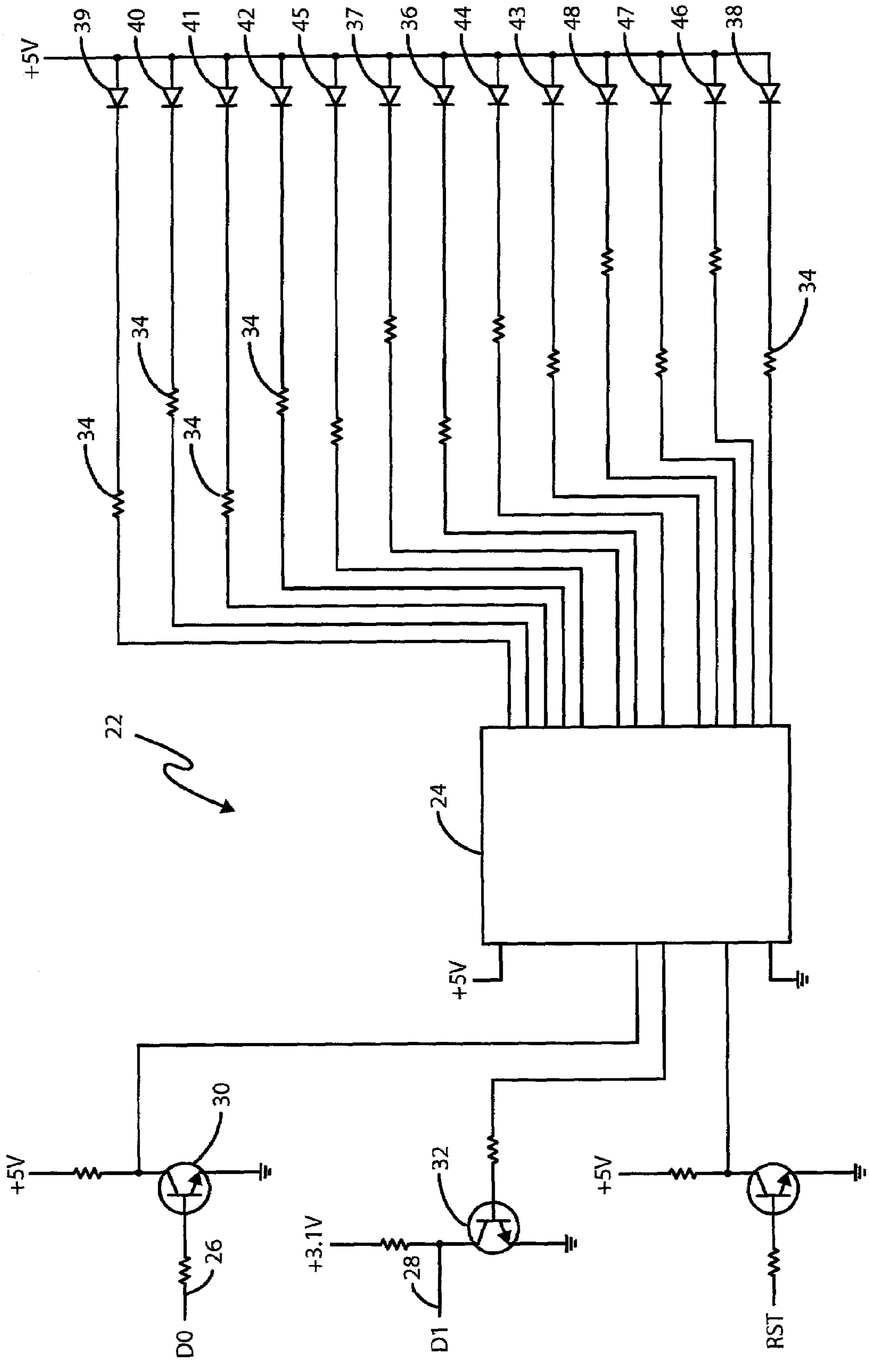
FIG. 3 is a schematic diagram of the Status & Message Display Module shown in FIG. 2.

The microprocessor-based controller 20 is connected in controlling relation to a status & message display module 22. FIG. 3 is a schematic diagram of the status & message display driver 22 and it preferably comprises a microcontroller 24 that is connected to data lines 26 and 28 by way of a data interface comprising NPN transistor switches 30 and 32, respectively.

The microcontroller 24, preferably a PIC 16F62 microcontroller, is especially designed to function as a display driver and its outputs are connected through current limiting resistors, as at 34, to visual signaling devices, here shown as LEDs 36–48. Ten of these LEDs (36–45) are used to convey alert message information to an observer while the remaining three (46–48) provide information as to the operating status of the system. One of the status indicators 46 is illuminated as long as alternating current power is being applied to the physical unit. A second indicator, 47, may be used to indicate the charge status of the back-up battery used in the system and the remaining status indicator 48 may be used to indicate that the system is disabled because, for example, a subscriber has not paid the monthly charge for the alerting service. An alpha readout 49 could also be included in addition to the visual signaling devices to provide further information to the end user.

Certain emergency conditions may require immediate action on the part of a subscriber. For example, a tornado warning may take place at a time that a subscriber is sleeping or otherwise out of visual contact with the physical unit. For this reason, an audible signaling device termed a siren is also included in the physical unit as represented by block 50 in FIG. 2. The issuance of an audible signal by the system results in the subscriber moving to a position to visually examine the physical unit's display panel to become advised of the nature of the alert.

To provide a more observable visual indication that a physical unit has received an alert message, a "visual enhancer" in the form of a flashing light bar, star or other pattern is provided as represented by block 52 in FIG. 2. In implementing block 52, the same type of display driver as is implemented in the Status & Message display 22 can be used. Upon receipt of an alarm-enable, the PIC 16 F62 microcontroller executes a program causing a plurality of light-emitting diodes that are physically arranged in a desired pattern to blink on and off either in synchronism or sequentially so as to create the illusion of movement. A subscriber noticing the flashing pattern would then approach the physical unit and view the particular alert message(s) being displayed by the visual signaling devices (LEDs) 36–45. The microcontroller 20 is also coupled to a set of contacts to control the operation of remotely located devices such as, but not limited to horns, light flashers, and vibrating devices as represented by block 54 in FIG. 2. Thus, in a commercial or industrial installation, an audible/visual signaling device located in a building remote from the physical unit itself can be actuated by an appropriate message picked up by the receiver 18 and processed by the microcontroller 20. The sounding or flashing device has its own power source that becomes connected to it when a "remote set" signal from microcontroller 20 actuates appropriate relay contacts (not shown). Those relay contacts become reset or reopened upon receipt of a remote-rst signal from the microcontroller 20.

It has also been found expedient to provide a historical memory in the physical unit itself for recording the time and date and type of alert events received by the physical unit in question. The historical memory is represented by block 56 and preferably may comprise an Electrically Erasable PROM memory such as a Type 24LC16B device. It has 16 kilobits, organized as eight blocks of 256× 8-bit memory. Those skilled in the art will appreciate, however, that other commercially available memory devices can be used as well.

With continued reference to FIG. 2, provision is made for manually resetting a physical unit following receipt of an alert message. The only end user input/control for the physical unit is a push-button momentary contact switch which when depressed causes a signal to be applied to the reset (RST) input to the receiver 18 and a /RST input to microcontroller 20 and selected inputs of the status & message display 22, the audible alarm 50 and the remote switch 54.

The central power module 57 (FIG. 2) comprises a full wave rectifier for converting AC line power to a DC voltage as well as conventional integrated circuit voltage regulators for providing the requisite operating voltages for the receiver 18, the CPU 20 and the circuits 22, 52, 54 and 56 shown in the system block diagram of FIG. 2. The central power 57 also includes a DC battery backup which takes over in the event of AC line power failure. A 9 volt battery fits into a compartment that is wired so as to render the compartment polarity insensitive. As such, it matters not which way the battery is inserted in the compartment. This avoids system malfunction in the event of an AC power failure if a subscriber had improperly inserted the battery into a battery compartment that has not been so wired as to be polarity insensitive.

Figure 4:
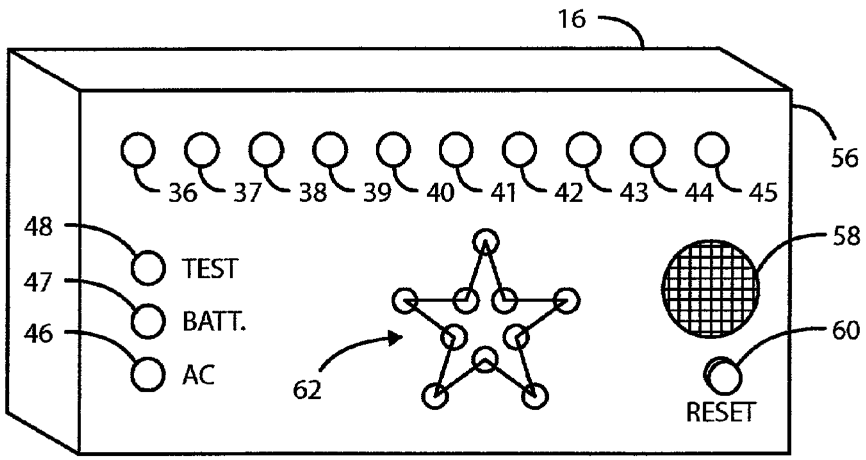
FIG. 4 is a front perspective view of a physical unit showing the layout of visual signaling devices thereon.

Referring to FIG. 4, there is shown a front perspective view of a physical unit 16 showing the layout of visual and audible signaling devices thereon. It comprises a box-like housing 56 in which printed circuit boards (not shown) carrying the circuitry depicted in the block diagram of FIG. 2 reside. The alert message visual signaling devices 36–45 may be arranged in a horizontal row while the status visual indicators 46, 47 and 48 may be grouped separately and may be arranged in a vertical pattern on the housing 56. The audible alarm (siren) 50 is disposed behind the top cover with an aperture through which the sound is emitted. The reset button 60 for the system reset block 62 in FIG. 2 also projects through an aperture formed in the housing 56 and is an integral part of the top overlay so as to be accessible to the subscriber.

The "visual enhancer" light array, as at 62, may also be provided. The on/off state of the individual LEDs is controlled by the microprocessor 20, which is adapted to send a signal over line 64 in FIG. 2 to the block 52 labeled Alarm Display. The LEDs in the array 62 are shown as being arranged in a star-shaped pattern, but other patterns may be used as well. By causing the array 76 to blink on and off at a desired rate, the fact that a message has been received by the physical unit 16 can readily be discerned whereby the subscriber can then more closely examine the physical unit and note which one(s) of the message indicators 36–45 has (have) been activated.

Figure 5:
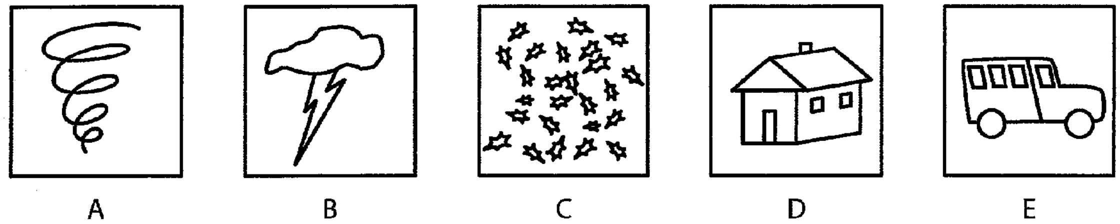
FIG. 5 shows a series of icons used on the unit of FIG. 4.

To render the nature of an alert condition more understandable, in accordance with the present invention, a suitable icon is associated with and possibly overlaid upon each of the message indicators. FIG. 5 illustrates only a few of the possible icons that may be applied over their associated LEDs so as to become illuminated when a particular alert event is being transmitted to the physical unit. In FIG. 5, icon A can be associated with, say, LED 36 in FIG. 3 to thereby indicate receipt of a tornado alert from the paging station. Icon B in FIG. 5 can be made overlay the LED 37 in FIG. 3, which then becomes illuminated when the alert condition being transmitted is a severe thunderstorm. Likewise, icon C may be associated with LED 38 to signal a snowstorm or blizzard. Icon D in FIG. 5 can be positioned over LED 39 to indicate a school closing alert. By controlling the LED 39, it can be made to blink to indicate a two-hour delay or it may remain on steadily to indicate an all day closing. Similarly, icon E representing a school bus may overlay the LED 40 to signal that buses are running late.

Those skilled in the art will recognize that the icons presented in FIG. 4 are somewhat arbitrary and are provided only as an example of how a particular alert being transmitted to the unit 16 is to be interpreted. Further information on the severity or urgency of a particular alert can be conveyed by a judicious choice of LED color for the message indicators.

Assume that an authorized individual or agency wishes to issue an alert to all subscribers residing in a given geographical area. The address code broadcast by the paging station may be based upon postal zip codes, which consume only five (or nine depending on the degree of localization desired) digits out of the total number of digits used. This leaves ample capacity for storing additional code digits for further defining particular subscriber physical units and alert types to which given physical unit 16 can be responsive.

The present invention also has the capability to issue and display multiple types of alerts simultaneously. For example, in the case of a snow storm in a particular area, an alert for the storm itself, and a school closing occasioned by the storm can be simultaneously displayed. The capability also exists for one physical unit 16 to be located in multiple physical or logical zones. For example, one physical unit could be part of weather zone 1 and school zone 1. A different physical unit could also be a part of weather zone 1 but reside in school zone 2. It is also possible to program a physical unit residing in weather zone 1 to respond to alerts for both weather zone 1 and weather zone 7, even if weather zone 7 is physically separate by geographical distance. Logical groups of common interest can also be alerted simultaneously, regardless of their geographic distance from one another. For example, members of the armed forces could reside in geographically disperse areas but could be considered as one logical group.

Figure 6:
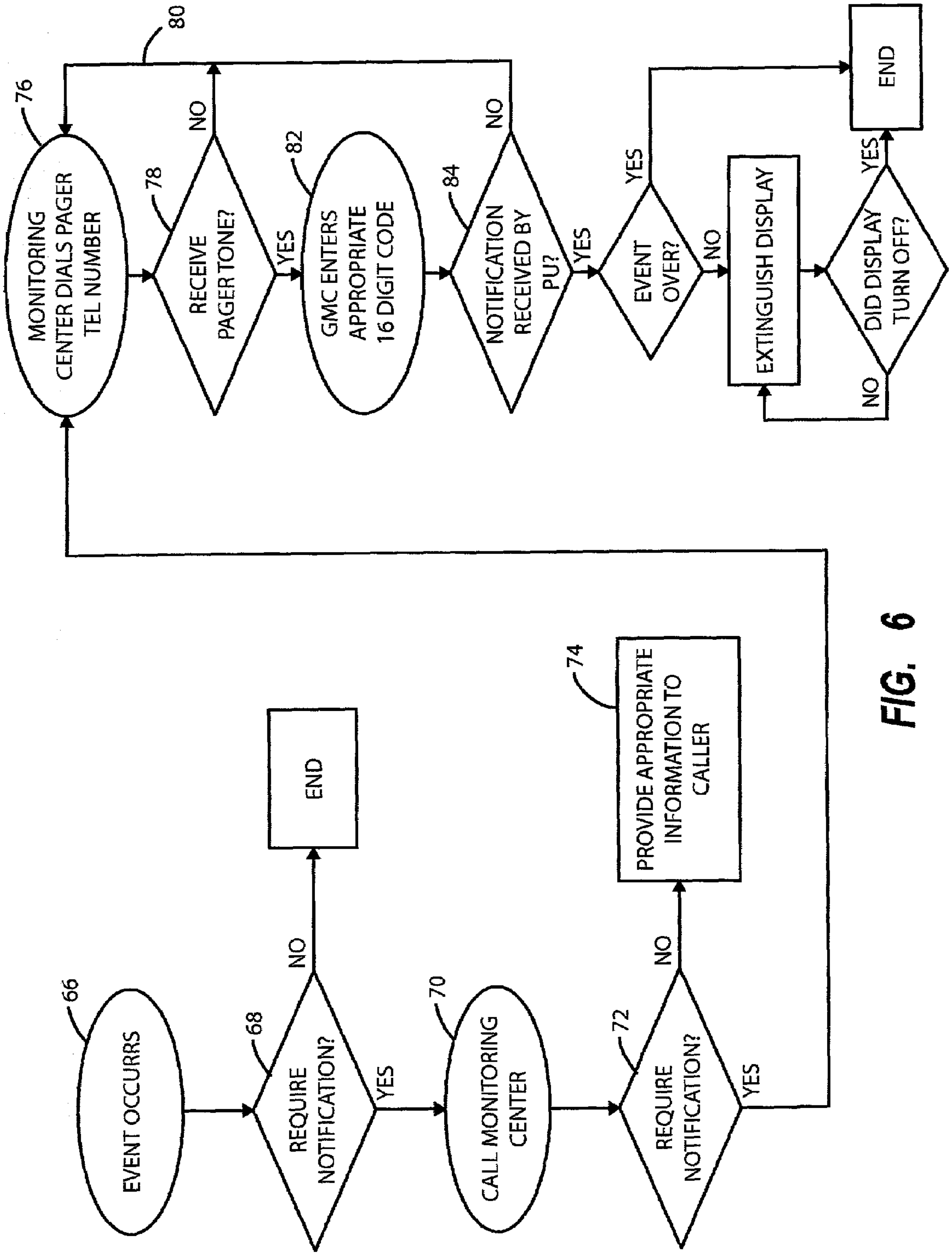
FIG. 6 is a functional flow diagram helpful in understanding the software algorithms used in implementing the system of FIG. 1.

Having described the apparatus involved in implementing the present invention, consideration will next be given to its mode of operation. In this regard, reference is made to the flow diagram of FIG. 6, which is illustrative of the algorithm executed by the hardware. Referring to block 66, an event occurs or a condition develops that requires the notification of an individual or group of individuals or a group of people having physical units 16 and subscribing to the alerting service. An authorized party, such as the National Weather Service, the State Patrol, a school district superintendent or a city official initially determines at decision block 68 whether the event is of a nature requiring notification to subscribers. If so, the authorized individual contacts the monitoring center 10 by a voice telephone call, fax message, e-mail, etc. (block 70). Notification in all cases will consist of the type of event or condition that exists, which may be an emergency or non-emergency. The notification will also specify the physical or logical area to be covered. Examples of an emergency event may include severe weather conditions, an environmental disaster or the like. A non-emergency event may be the existence of a lawn sprinkling ban to conserve water, delayed school openings and periodic system tests that are regularly scheduled and issued automatically by the monitoring center for the purpose of performing a non-intrusive end to end test of the system. System tests can be performed on a per physical unit basis, a group by group basis, or globally to include all units.

A determination is made at decision block 72 to verify that the caller is authorized to initiate the type of alert to be issued. If the caller does not have the proper level of authorization, he is so advised and no alert is issued (block 74).

If, on the other hand, the individual calling the monitoring center is authorized to issue a particular alert, the monitoring center dials the appropriate pager number(s), or accesses the paging service provide via a data network (block 76). It should be recalled at this point that all of the physical units 16 contain paging receivers 18 that are preprogrammed to respond to the same CAP code. All of the physical units will, therefore, receive all messages sent from the paging station 14 that are associated with that paging telephone number, whether it is intended that those particular physical units are to respond or not. The determination as to whether or not a particular physical unit should respond is made by comparing the incoming signal data stream and the data base which resides in the physical unit, looking for a match as a result of the comparison.

A test is made at decision block 78 as to whether the monitoring center has received a pager tone or data connection confirmation and, if not, control loops back over line 80 causing the monitoring center to redial the pager number or reconnect the data network until the test at decision block 78 is satisfied. At this point, the monitoring center inputs the appropriate data such as, but not limited to a 16 decimal digit code (block 82). This code represents a combination of whether or not one or more of the physical units 16 should respond to the input code and the manner in which the response is to be made. To include a single physical unit, the unit's unique address would be sent along with the data stream instructing the unit as to how to respond. To address multiple units simultaneously, the use of "wild card" characters would be used to indicate all users of a particular sub group. For example, if the address data of each unit was nine characters long, wild card characters in place of digits six through nine would alert all units matching the first five digits irrespective of what the last four digits were. The use of wild card characters for all nine digits would equate to all units, therefore all unit would respond to the following string of data which would convey exactly how the physical unit should respond.

It is to be recalled at this point that all of the physical units 16 are preprogrammed with a list of one or more codes to which they will respond. All physical units are also preprogrammed with instructions as to how they should respond to a given code that matches one on their list, e.g., visual signal only, audible signal only, both visual and audible signals, whether the remote contacts should be actuated, etc. Furthermore, multiple codes can be stacked on an individual physical unit meaning, for example, that a visual indication indicative of severe weather and sound can be turned on simultaneously when a test light also has been turned on.

A test is made at decision block 84 to determine whether the physical units receive the code from the paging transmitter and, if not, control again passes over line 80 causing the monitoring center to again redial the pager number. If, however, the code was properly received, the subscriber unit responds appropriately to the notification. The subscriber's attention is captured by the flashing "visual enhancer" 62 and by the individual visual signaling LEDs and/or sound output. Their focus is then brought to the individual light(s) that are illuminated. The screening which overlays the individual lights bearing the icons serves to indicate what the particular light represents. Additional information may be communicated via an alpha display screen 49 as well.

If the subscriber desires to cancel the notification, he or she can depress the user interface button 60 and if the physical unit's programming allows, shut off the light and/or sound. It is be understood, however, that certain notifications are not able to be reset by the end-user and will require cancellation from the monitoring center via the same process used in which they were individually actuated, it being understood that a different code is employed to terminate a notification.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. An electronic messaging system comprising:

(a) a plurality of physical units, each comprising:

(i) a microprocessor having a memory associated therewith, (ii) a plurality of light sources controlled by the microprocessor;

(iii) an icon associated with each of said plurality of light sources; and (iv) a paging receiver responsive to a predetermined RF carrier frequency transmitted by a paging terminal and adapted to receive encoded messages in accordance with a predetermined protocol from said paging terminal on a non-prioritized basis, said encoded messages including an address code and whereby said physical units can be grouped either on a geographical or logical basis in that only those physical units whose paging receiver is tuned to said predetermined carrier frequency, and having an address matching said address code, can forward the data to said microprocessor for causing the microprocessor to actuate more than one of the plurality of light sources simultaneously in accordance with the received data for illuminating selective ones of said icons, thereby providing notification of multiple alert conditions at a given time.

2. The electronic messaging system as in claim 1 wherein the light sources are selected from a group consisting of light-emitting diodes, liquid crystal displays, plasma displays and electro luminance displays.

3. The electronic messaging system as in claim 2 and wherein the icons are physically associated with predetermined ones of the plurality of light sources for providing a non-lingual indication of the predetermined alert conditions that are the subject of the received data.

4. The electronic messaging system as in claim 3 wherein selected ones of the plurality of light sources provide operational status of the electronic messaging system to a person observing a physical unit.

5. The electronic messaging system as in claim 3 wherein the electronic messaging system or portions thereof may be enabled or disabled from a remotely located monitoring center.

6. The electronic messaging system as in claim 2 and further including an auxiliary jack to enable the use of remote attention getting devices.

7. The electronic messaging system as in claim 6 wherein the microprocessor of the physical units may be remotely programmed from a monitoring center while located remotely from said monitoring center.

8. The electronic messaging system as in claim 2 and further including a alpha/numeric display for receiving text messages.

9. The electronic messaging system as in claim 1 wherein the light sources are liquid crystal displays.

10. The electronic message system as in claim 1 wherein the physical unit retains a historical log in said memory for past notifications received.

11. The electronic messaging system as in claim 1 and further including an audible signaling device controlled by the microprocessor.

12. The electronic messaging system as in claim 11 wherein the microprocessor includes a memory for storing a code list to which a given physical unit will respond when data from the paging terminal matches an entry in said code list.

13. The electronic messaging system as in claim 12 wherein the microprocessor is programmed to respond in a way dependent upon which entry in the code list is matched to selectively activate said visual and audible signaling devices.

14. The electronic messaging system as in claim 13 and further including a manual operable end user interface switch which, when actuated, sends a signal to the microprocessor for deactivating those signaling devices which the microprocessor allows to be end user deactivated.

15. The electronic messaging system as in claim 1 and further including an AC power source and having a DC battery backup in event of an AC power failure.

16. The electronic messaging system as in claim 15 wherein the battery backup is polarity insensitive.

17. An electronic messaging system comprising:
(a) a monitoring center for accepting alerts from authorized agencies;
(b) at least one paging terminal having the ability to broadcast a radio frequency carrier suitably modulated with information including addressing data and message data, said at least one paging terminal adapted to receive paging instructions from said monitoring center pertaining to an alert;
(c) a plurality of physical units grouped on either a geographical or a logical basis using said addressing data, each including
(i) a receiver tuned to said carrier frequency, the receiver including a demodulator for recovering the addressing data and message data,
(ii) a microprocessor coupled to the receiver to receive the addressing data and message data, the microprocessor having a memory for storing a code list,
(iii) a plurality of light sources controlled by the microprocessor, selected ones of the plurality of light sources being activated only when received addressing data matches entries in said code list and whereby multiple light sources can be simultaneously activated to signal multiple alert conditions at a given time; and
(iv) a fixed icon associated with each of said plurality of light sources and which, when illuminated provides a non-lingual notification of one or more predetermined alerts.

18. The electronic messaging system of claim 17 wherein the one(s) of the plurality of light sources activated is determined from said message data.

19. The electronic messaging system of claim 17 wherein the plurality of light sources include an individual array of light sources forming a predetermined pattern to enhance the attraction of attention by an observer that an alert condition is being signaled.

20. The electronic messaging system as in any one of claims 17, 18 and 19 and further including an audible alarm in the physical unit controlled by the microprocessor.

21. The electronic messaging system of claim 20 and further including a manually operated switch coupled to the microprocessor for selectively extinguishing the audible alarm and predetermined ones of the visual indicating devices.

22. The electronic messaging system as in claim 20 wherein the audible alarm can operate in a plurality of modes.

23. The electronic messaging system as in claim 17 wherein the addressing data includes a cap code associated with a carrier frequency to which a physical unit may be tuned.

24. The electronic messaging system of claim 17 wherein selected ones of the plurality of light sources provide an indication of operating status of the electronic messaging system.

25. The electronic messaging system of claim 17 wherein the monitoring center is coupled through one of a public switched telephone network and a data network to the paging terminal.

26. The electronic messaging system of claim 17 wherein message data includes a test code for causing one of the plurality of visual signaling devices of the physical unit to be activated when the paging terminal and the receiver, the microprocessor and the visual signaling devices are operational.

27. The electronic messaging system of claim 17 wherein the end to end system tests and alerts may be performed on an individual, group, or global basis.

28. The electronic messaging system as in claim 17 wherein the plurality of light sources are each capable of operating in at least three distinct modes.

29. The electronic messaging system as in claim 17 wherein status of the plurality of light sources and audible indicating devices may be changed remotely from the monitoring center.

* * * * *